(12) United States Patent
McKitterick

(10) Patent No.: US 8,311,695 B2
(45) Date of Patent: Nov. 13, 2012

(54) CONSTRUCTION OF EVIDENCE GRID FROM MULTIPLE SENSOR MEASUREMENTS

(75) Inventor: John B. McKitterick, Columbia, MD (US)

(73) Assignee: Honeywell International Inc., Morristown, NJ (US)

( * ) Notice: Subject to any disclaimer, the term of this patent is extended or adjusted under 35 U.S.C. 154(b) by 1174 days.

(21) Appl. No.: 12/051,801

(22) Filed: Mar. 19, 2008

(65) Prior Publication Data

US 2009/0238473 A1  Sep. 24, 2009

(51) Int. Cl.
G01C 22/00 (2006.01)
(52) U.S. Cl. .................. 701/23; 701/25; 701/301
(58) Field of Classification Search .......... 701/207, 701/210, 203, 23, 25, 301
See application file for complete search history.

(56) References Cited

U.S. PATENT DOCUMENTS

| 5,471,214 | A  | * | 11/1995 | Faibish et al. ............ 342/70 |
| 7,839,322 | B2 | * | 11/2010 | Filias et al. ............ 342/33 |
| 2004/0178943 | A1 | * | 9/2004 | Niv ................ 342/29 |
| 2006/0125680 | A1 |   | 6/2006 | Thackray |
| 2008/0007450 | A1 |   | 1/2008 | Yedidia |
| 2009/0238473 | A1 |   | 9/2009 | McKitterick |

FOREIGN PATENT DOCUMENTS

| WO | 9507473 A1 | 3/1995 |
| WO | 2007028932 | 3/2007 |

OTHER PUBLICATIONS

European Patent Office, "European Search Report", Jul. 13, 2009, Published in: EP.
Kulich et al., "Robust Data Fusion With Occupancy Grid", "IEEE Transactions on Systems, Man and Cybernetics: Part C: Applications and Reviews", Feb. 1, 2005, pp. 106-115, vol. 35, No. 1, Publisher: IEEE Service Center.
Linzmeier et al., "A Pedestrian Detection System Based on Thermopile and Radar Sensor Data Fusion", "Information Fusion, 2005 7th International Conference on Philadelphia, PA", Jul. 25, 2005, pp. 1272-1279, vol. 2, Publisher: IEEE.
Goshi, D S et al, Recent advances in 94 GHz FMCW imaging radar development, Microwave Symposium Digest, 2009. MTT '09. IEEE MTT-S International, pp. 77-80.

* cited by examiner

*Primary Examiner* — Robert M. Pond
(74) *Attorney, Agent, or Firm* — Lowe Graham Jones PLLC

(57) ABSTRACT

A system includes at least one sensor device configured to transmit a first detection signal over a first spatial region and a second detection signal over a second spatial region. The second region has a first sub-region in common with the first region. The system further includes a processing device configured to assign a first occupancy value to a first cell in an evidence grid. The first cell represents the first sub-region, and the first occupancy value characterizes whether an object has been detected by the first detection signal as being present in the first sub-region. The processing device is further configured to calculate, based on the first and second detection signals, the probability that the first occupancy value accurately characterizes the presence of the object in the first sub-region, and generate a data representation of the first sub-region based on the probability calculation.

6 Claims, 5 Drawing Sheets

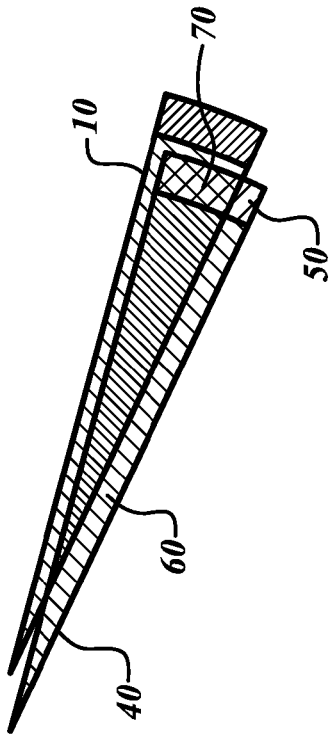
FIG. 2 *(Prior Art)*
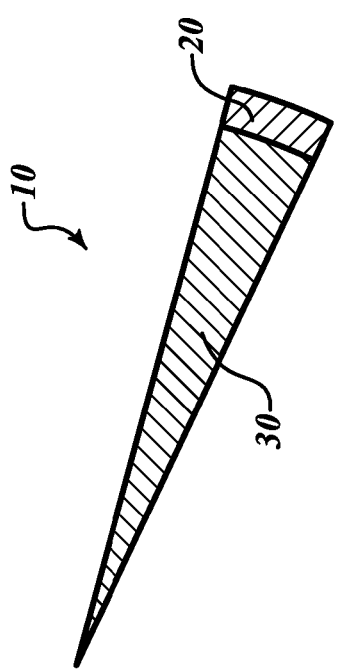
FIG. 1 *(Prior Art)*

CONSTRUCTION OF EVIDENCE GRID FROM MULTIPLE SENSOR MEASUREMENTS

BACKGROUND OF THE INVENTION

One method of combining multiple measurements from a sensor or a suite of sensors is to use an evidence grid. An evidence grid, also called an occupancy matrix, is merely a two- or three-dimensional matrix of cells, which are to be marked as either occupied or not occupied. The resulting matrix of occupied and unoccupied cells serves as a representation of the real-world scene that the sensors are sensing.

The usual method of filling out an evidence grid is to take each measurement and determine from it whether cells in the grid are occupied or not. As subsequent measurements are made, the cells in the grid are updated, but not necessarily with regard to the results of previous measurements. As a result, there is no real meaningful combining of the data from multiple measurements, nor is there any real method of combining measurements from different types of sensors.

FIG. 1 illustrates in two dimensions a three-dimensional volume 10 detected as a result of a single signal transmitted by a radar or other sensing device (not shown). As detected by the sensing device, the volume 10 includes an occupied region 20 indicating the detected presence therein of a reflecting object. The volume 10 further includes an unoccupied region 30 within which no reflecting object is detected. Analysis of this single radar return cannot effectively use the information associated with the unoccupied region 30.

FIG. 2 illustrates in two dimensions the volume 10 and a three-dimensional volume 40 detected as a result of a second signal transmitted by a radar or other sensing device (not shown). As detected by the sensing device, the volume 40 includes an occupied region 50, closer to the sensing device than the region 20, indicating the detected presence therein of a reflecting object. The volume 40 further includes an unoccupied region 60 within which no reflecting object is detected. The combination of the volumes 10 and 40 reveals a region 70 wherein no object seems to be present, despite the indication of the region 50. As such, by combining these two radar returns, one can better identify volumes of the target regions as being occupied or not.

FIG. 3 illustrates in two dimensions the volumes 10, 40 and a three-dimensional volume 80 detected as a result of a third signal transmitted by a radar or other sensing device (not shown) and superimposed on a corresponding evidence grid 85. As detected by the sensing device, the volume 80 includes an occupied region 90, farther from the sensing device than the regions 20, 50, indicating the detected presence therein of a reflecting object. The volume 80 further includes an unoccupied region 100 within which no reflecting object is detected. The combination of the volumes 10, 40 and 80 reveals that portions of the region 50 offer conflicting information as to whether the region 50 is occupied by an object. Such conflicting information may result from sensor or navigation errors, or moving targets, that lead to indeterminate points that are neither occupied nor unoccupied.

SUMMARY OF THE INVENTION

In an embodiment of the invention, a system includes at least one sensor device configured to transmit a first detection signal over a first spatial region and a second detection signal over a second spatial region. The second region has a first sub-region in common with the first region. The system further includes a processing device configured to assign a first occupancy value to a first cell in an evidence grid. The first cell represents the first sub-region, and the first occupancy value characterizes whether an object has been detected by the first detection signal as being present in the first sub-region. The processing device is further configured to calculate, based on the first and second detection signals, the probability that the first occupancy value accurately characterizes the presence of the object in the first sub-region, and generate a data representation of the first sub-region based on the probability calculation.

BRIEF DESCRIPTION OF THE DRAWINGS

Preferred and alternative embodiments of the present invention are described in detail below with reference to the following drawings.

FIG. 1 illustrates in two dimensions a three-dimensional volume detected as a result of a single signal transmitted by a radar or other sensing device;

FIG. 2 illustrates in two dimensions the volume of FIG. 1 and a three-dimensional volume detected as a result of a second signal transmitted by a radar or other sensing device;

DETAILED DESCRIPTION OF THE PREFERRED EMBODIMENT

An embodiment includes a firm theoretical basis and an easy computational method for extracting an evidence grid from multiple measurements. An embodiment will be discussed as applying to a radar application, but the extension to other sensors, such as lidar, is also contemplated.

The evidence grid at its most basic is just a collection of points, and a measure of occupancy at each of these points. Typically, the collection of points forms a uniform grid in three-dimensions, but the uniformity is not required. The measure of occupancy of a cell can be interpreted as the probability that the cell is occupied. A question addressed herein is how to arrange the occupancies of the cells in the evidence grid so as to match as well as possible the measurements corresponding to the sensed environment.

An approach includes asking the related question: given a proposed evidence grid, with probabilities of occupancy assumed for each cell, what is the probability that occupancy of the cells in this evidence grid will match actual spatial occupancy? If we can make that calculation as a function of the occupancies of the cells, then we can turn the problem of how to fill out the occupancies of the cells in the evidence grid into a related optimization problem, to find the occupancies of the cells that maximize the probability that (modeled) measurements of the evidence grid match the (actual) measurements of the real world.

Figure 3:
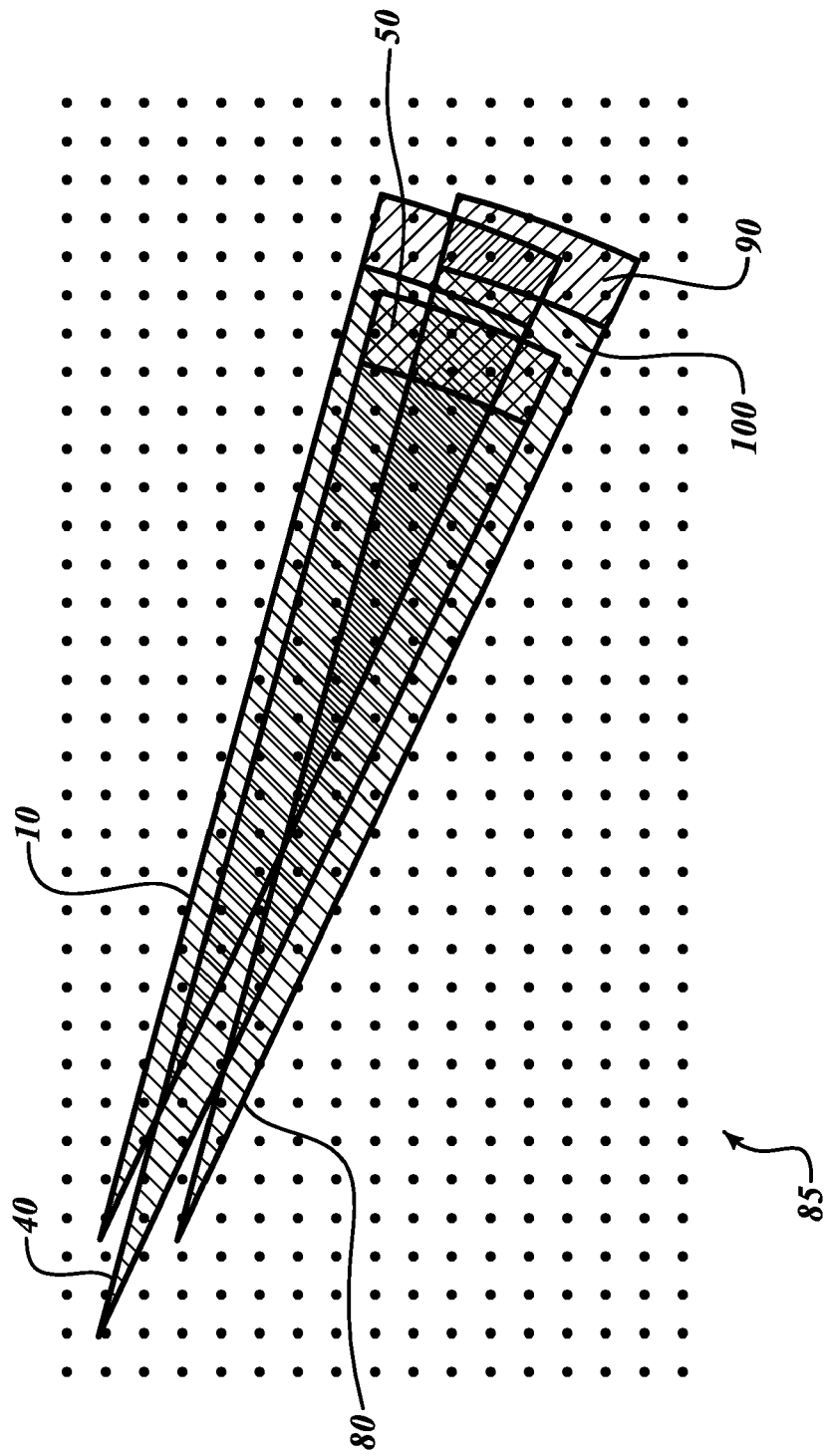
FIG. 3 illustrates in two dimensions the volumes of FIGS. 1 and 2 and a three-dimensional volume detected as a result of a third signal transmitted by a radar or other sensing device.
Figure 4:
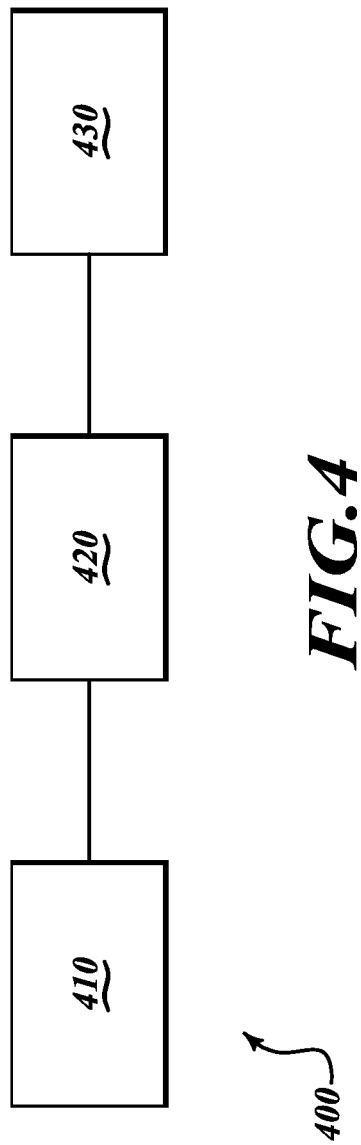
FIG. 4 illustrates a system according to an embodiment of the invention.

FIG. 4 illustrates a system 400 according to an embodiment of the invention. System 400 includes a sensor device 410, such as a radar, lidar or combination device, a processing device 420, such as a computer, microprocessor or other appropriate computational device, and an optional display device 430, such as a synthetic vision system. The sensor device 410 is operable to transmit multiple simultaneous and/or sequential sensory (detection) signals in a manner, and of a configuration, at least similar to that illustrated in FIGS. 2 and 3. The display device may be operable to display a representation of the terrain or other environment surveyed by the sensor device.

Figure 5:
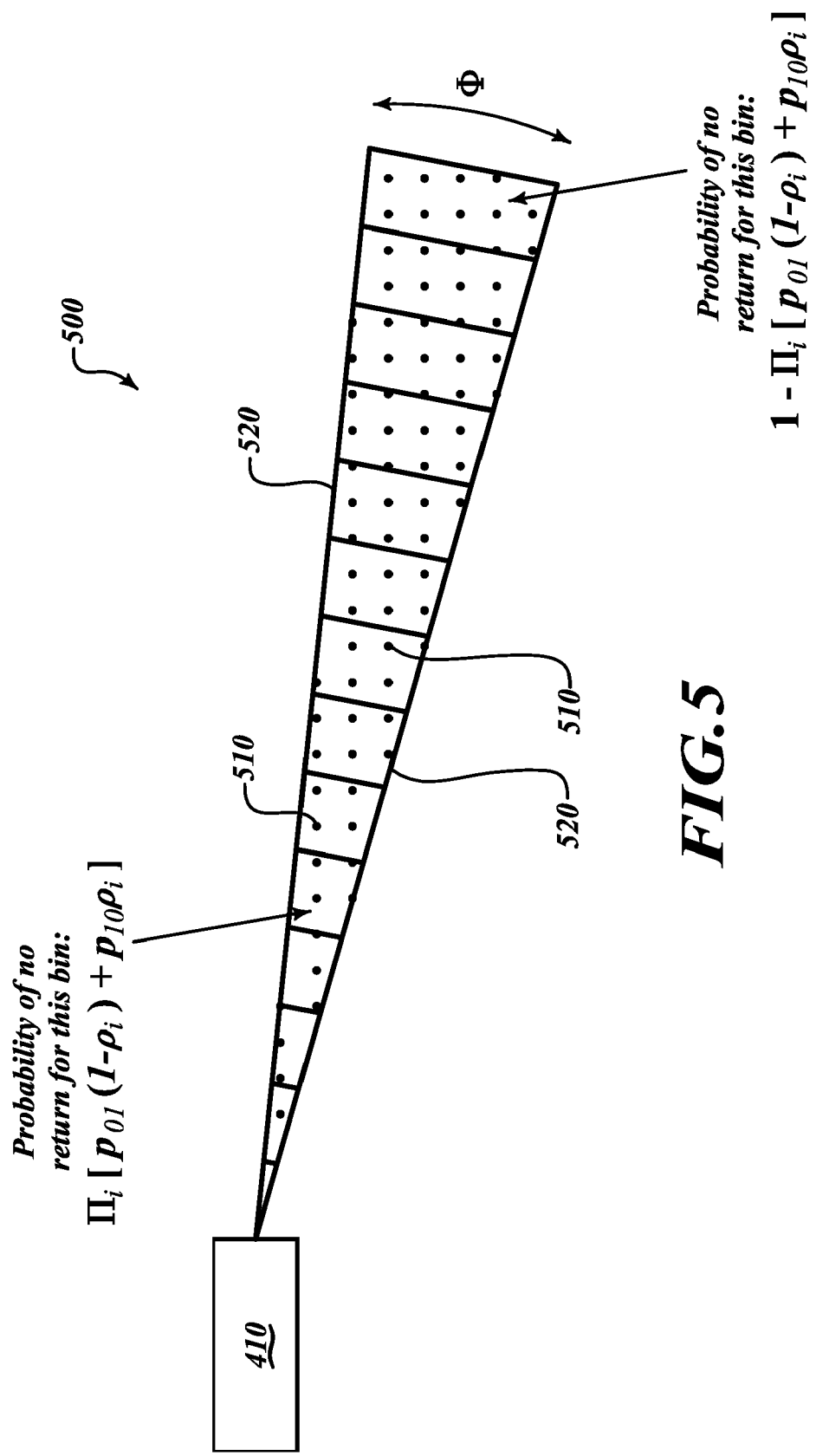
FIG. 5 a spatial region that can be modeled by an evidence grid according to an embodiment of the invention.

Referring now to FIG. 5, consider a measurement made by the sensor device 410 of a spatial region 500 that can be modeled by an evidence grid. In FIG. 5, center points 510 of cells of the evidence grid representing sub-regions of the region 500 are shown superimposed on the region 500. Additionally, the region 500 is illustrated as being divided into multiple bins 520, each of which includes one or more such cells and is a respective distance from the sensor device 410. The region 500 has some angular width $\Phi$ (i.e., may be conical in configuration), within which a beam transmitted by the sensor device 410 will, with some probability, reflect off of a volume in space represented in the evidence grid by an occupied cell. For simplicity, we can call $p_{11}$ the probability that a volume in space represented by an occupied cell reflects the beam, and can, but need not, make the assumption that this probability is independent both of the distance from the sensor device 410 (up to the maximum range of the sensor device), and of the angle from the central axis of the sensor device (up to the angular width of the beam).

Similarly, we can call $p_{00}$ the probability that a volume in space represented by an unoccupied cell does not reflect the beam. From these, we can easily obtain the probability that a volume in space represented by an unoccupied cell reflects the beam (a false positive response from the sensor) as $p_{01}=1-p_{00}$, and also the probability that a volume in space represented by an occupied cell does not reflect the beam (a false negative response) as $p_{10}=1-p_{11}$.

Now suppose one of the actual radar measurements results in a first detection at some bin 520 at a distance r from the sensor device 410. The radar measurement is actually a measurement not just at the distance r, but also returns information about the bins 520 that are at a distance less than r from the sensor device 410. Hence, the probability that a theoretical radar measurement of an evidence grid is the same as a measurement of the actual sensed environment can be calculated as follows. First, we may consider the probability that a single cell makes a reflection. Letting $\rho_i$ be the probability that the ith cell in the evidence grid is occupied, then the probability that the ith cell produces a reflection is:

$$p_i = p_{11}\rho_i + p_{01}(1-\rho_i) \quad (1)$$

and the probability that the the ith cell does not produce a reflection is:

$$\tilde{p}_i = 1 - p_i = p_{10}\rho_i + p_{00}(1-\rho_i) \quad (2)$$

For each range bin 520 up to but not including the range bin within which an object is detected, the probability that there is no return is simply the probability that each of the cells in that range bin do not reflect the beam, which may be expressed as $\Pi_i \tilde{p}_i$. For the range bin 520 in which there was an object detection, the probability that there is a reflection given the state of the evidence grid is obtained by calculating the probability that there was no detection and subtracting from 1, or $1-\Pi_i \tilde{p}_i$. This simply states that in order to detect a reflection, at least one of the cells must have reflected the beam. The net result for the probability that a theoretical radar measurement of the evidence grid matches the actual radar measurement of the sensed environment is thus $$P_k = \Pi_{ik}\tilde{p}_{ik}[1 - \Pi_{jk}\tilde{p}_{jk}] \quad (3)$$

where the subscript ik runs in the kth radar beam over all of the cells lying in the range bin(s) 520 closer to the sensor device 410 than the range bin in which there was an object detection, and the subscript jk runs in the kth radar beam over all of the cells lying in the range bin in which there was an object detection. Then, the processing device 420 can calculate the probability that all of the theoretical radar measurements made on the evidence grid matches the actual measurements made by multiple beams transmitted by the sensor device 410 as $$\beta = \Pi_k P_k \quad (4)$$

The goal is to find the occupancies $\rho_i$ which maximize $\beta$. In so doing, we will have found the occupancies that are most likely to match the measurements of the actual sensed environment.

The product in Eq. (4) can be rearranged so that it is more transparent. In particular, we can examine the dependence of $\beta$ on the occupancy of a single cell:

$$\beta = \{\Pi_k \tilde{p}_i \Pi_{k'}[1 - \Pi_j n \tilde{p}_{jk}]\} \cdot [\text{terms independent of } \rho_i] = P(\rho_i) \cdot [\text{terms independent of } \rho_i] \quad (5)$$

where the product k is over the radar beams for which the ith cell is in the beam but from which there is no return in the corresponding range bin, and the product over k' is over the radar beams for which the ith cell is in the range bin for which there was a detection. This expression splits the dependence on $\rho_i$ into two parts. The first part is a measure of how often the cell is not seen by a radar beam. The second part is a measure of how well the current evidence grid supports the actual measured returns.

A few observations about the result in Eq. (5) follow. First, if a cell never appears in a detected range bin, then the second product in Eq. (5) (over k') is empty and the occupancy of the cell can be set to zero. In other words, if the cell is never in a detection range bin of any radar beam, then its occupancy can be set to zero. Second, if the first product in Eq. (5) is empty, then the cell has never not been seen by a radar beam. In this case, $\rho_i$ can be set to 1.

To solve for the optimum occupancies for those cells which cannot be trivially set to 0 or 1, one may examine more closely the quantity inside the braces in Eq. (5), $P(\rho_i)$. An embodiment seeks the maximum of $\beta$ with respect to the $\rho_i$, subject to the constraint that $0 \leq \rho_i \leq 1$ (since $\rho_i$ is a probability of occupancy).

We are at the maximum of $\beta$ when one of the following conditions is met for each cell (note that this optimization is a constrained optimization, since $0 \leq \rho_i \leq 1$):

$$\partial P(\rho_i)/\partial \rho_i = 0, \ 0 < \rho_i < 1$$

$$\partial P(\rho_i)/\partial \rho_i > 0, \ \rho_i = 1$$

$$\partial P(\rho_i)/\partial \rho_i < 0, \ \rho_i = 0 \quad (6)$$

Solving these equations for the optimum point may be done in a conventional manner, such as using, for example, a steepest-descent method. Each of the calculations discussed above herein may be performed completely or partially by the processing device 420.

Figure 6:
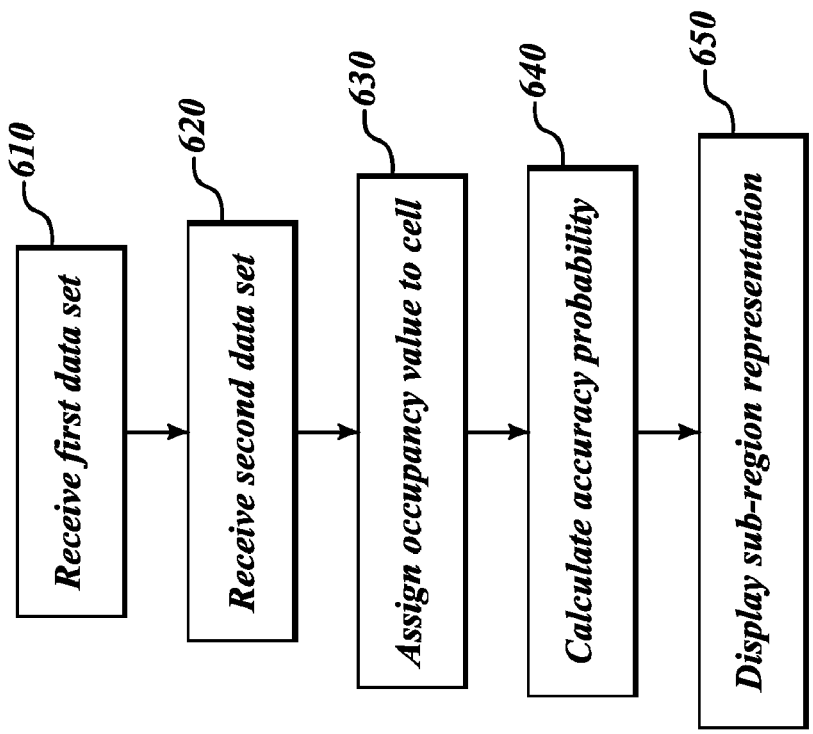
FIG. 6 illustrates a process according to an embodiment of the invention.

FIG. 6 illustrates a process 600 according to an embodiment of the invention. The process 600 is illustrated as a set of operations shown as discrete blocks. The process 600 may be implemented in any suitable hardware, software, firmware, or combination thereof. As such the process 600 may be implemented in computer-executable instructions that can be stored on a computer-readable medium and/or transferred from one computer, such as a server, to a second computer or other electronic device via a communications medium. The order in which the operations are described is not to be necessarily construed as a limitation.

At a block 610, a first data set is received corresponding to a first detection signal transmitted over a first spatial region. For example, the processing device 420 may receive data corresponding to a first measurement made of a first geographic area of interest by the sensor device 410.

At a block 620, a second data set is received corresponding to a second detection signal transmitted over a second spatial region. The second region may have a first sub-region in common with the first region. For example, the processing device 420 may receive data corresponding to a second measurement made of a second geographic area of interest by the sensor device 410. The second geographic area may be the same as or partially overlap the first geographic area.

At a block 630, based on the first data set, a first occupancy value is assigned to a first cell in an evidence grid. The first cell may represent the first sub-region. The first occupancy value characterizes whether an object has been detected by the first detection signal as being present in the first sub-region. For example, the processing device 420 may generate an evidence grid corresponding to the first geographic area and assign occupancy values (i.e., occupied/unoccupied) to one or more of the cells in the grid based on the presence or absence of reflecting objects detected in the first geographic area.

At a block 640, based on the first and second data sets, the probability that the first occupancy value accurately characterizes the presence of the object in the first sub-region is calculated. For example, the processing device 420 may perform the optimum cell occupancy calculations described above herein.

At a block 650, a representation of the first sub-region is displayed based on the probability calculation. For example, after performing the optimum cell occupancy calculations, the processing device 420 may generate a displayable model of the surveyed geographical regions to the display device 430.

While a preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A computer-readable medium including instructions that when executed by an electronic device perform the steps of:
   receiving a first data set corresponding to a first detection signal transmitted over a first spatial region;
   receiving a second data set corresponding to a second detection signal transmitted over a second spatial region, the second region having a first sub-region in common with the first region;
   based on the first data set, assigning a first occupancy value to a first cell in an evidence grid, the first cell representing the first sub-region, the first occupancy value characterizing whether an object has been detected by the first detection signal as being present in the first sub-region;
   calculating, based on the first and second data sets, the probability that the first occupancy value accurately characterizes the presence of the object in the first sub-region; and
   displaying a representation of the first sub-region based on the probability calculation,
   wherein calculating the probability comprises calculating the probability that the first sub-region represented by the first cell reflects at least one of the plurality of detection signals and the probability that the first sub-region represented by the first cell does not reflect at least one of the plurality of detection signals,
   wherein each of the first and second spatial regions comprises a respective plurality of volumetric bins, each said bin comprising at least one sub-region, the first sub-region being located in at least one of the bins, each sub-region being represented by a corresponding cell in the evidence grid,
   wherein calculating the probability further comprises calculating a first probability that each sub-region within a first bin of the first spatial region does not reflect at least one of the plurality of detection signals and a second probability that each sub-region within a first bin of the second spatial region does not reflect at least one of the plurality of detection signals,
   wherein calculating the probability further comprises calculating a third probability that each sub-region within a second bin of the first spatial region reflects at least one of the plurality of detection signals and a fourth probability that each sub-region within a second bin of the second spatial region does not reflect at least one of the plurality of detection signals,
   wherein calculating the probability further comprises:
      calculating a first product of the first probability corresponding to at least one bin of the first spatial region and the third probability corresponding to at least one bin of the first spatial region;
      calculating a second product of the second probability corresponding to at least one bin of the second spatial region and the fourth probability corresponding to at least one bin of the second spatial region;
      calculating a third product of the first and second products; and
      calculating the maximum of the third product.

2. The medium of claim 1 wherein the evidence grid is three-dimensional.

3. The medium of claim 1 wherein the first spatial region is conical in configuration.

4. A system, comprising:
   at least one sensor device configured to transmit a first detection signal over a first spatial region and a second detection signal over a second spatial region, the second region having a first sub-region in common with the first region; and
   a processing device configured to:
      assign a first occupancy value to a first cell in an evidence grid, the first cell representing the first sub-region, the first occupancy value characterizing whether an object has been detected by the first detection signal as being present in the first sub-region,
      calculate, based on the first and second detection signals, the probability that the first occupancy value accurately characterizes the presence of the object in the first sub-region,
      generate a data representation of the first sub-region based on the probability calculation,
      calculate the probability that the first sub-region represented by the first cell reflects at least one of the plurality of detection signals,
      calculate the probability that the first sub-region represented by the first cell does not reflect at least one of the plurality of detection signals, wherein each of the first and second spatial regions comprises a respective plurality of volumetric bins, each said bin comprising at least one sub-region, the first sub-region being located in at least one of the bins, each sub-region being represented by a corresponding cell in the evidence grid, calculate a first probability that each sub-region within a first bin of the first spatial region does not reflect at least one of the plurality of detection signals and a second probability that each sub-region within a first bin of the second spatial region does not reflect at least one of the plurality of detection signals, calculate a third probability that each sub-region within a second bin of the first spatial region reflects at least one of the plurality of detection signals and a fourth probability that each sub-region within a second bin of the second spatial region does not reflect at least one of the plurality of detection signals, calculate a first product of the first probability corresponding to at least one bin of the first spatial region and the third probability corresponding to at least one bin of the first spatial region;

calculate a second product of the second probability corresponding to at least one bin of the second spatial region and the fourth probability corresponding to at least one bin of the second spatial region, calculate a third product of the first and second products, and calculate the maximum of the third product.

5. The system of claim 4 wherein the at least one sensor device comprises a radar-type device and a device type other than a radar-type device.

6. The system of claim 4 wherein the first spatial region is conical in configuration.

* * * * *